No. 815,300. PATENTED MAR. 13, 1906.
A. V. LINDQUIST.
FILM DEVELOPING MACHINE.
APPLICATION FILED APR. 27, 1904. RENEWED NOV. 28, 1905.
2 SHEETS—SHEET 1.
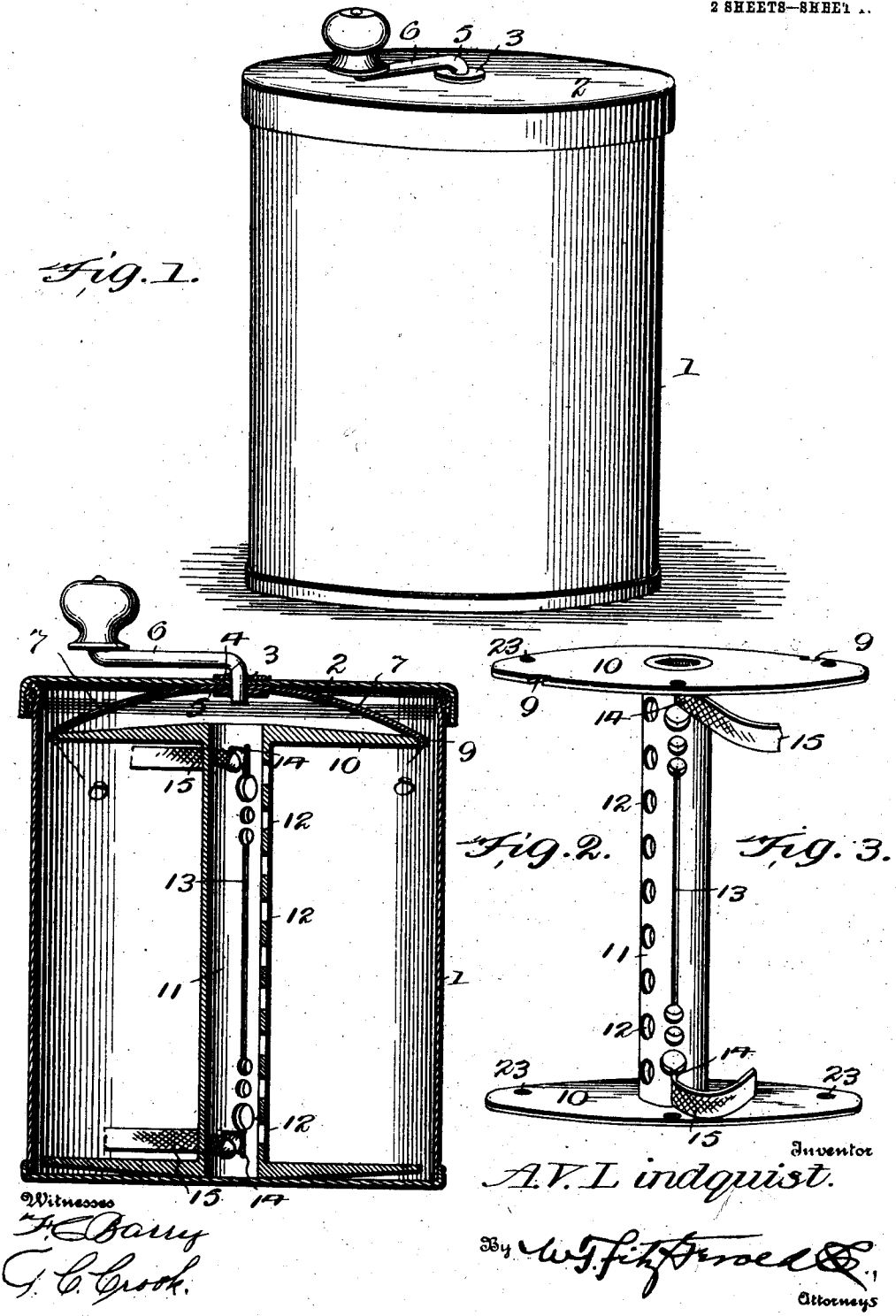

No. 815,300. PATENTED MAR. 13, 1906.
A. V. LINDQUIST.
FILM DEVELOPING MACHINE.
APPLICATION FILED APR. 27, 1904. RENEWED NOV. 28, 1905.

2 SHEETS—SHEET 2.

Inventor
A. V. Lindquist

UNITED STATES PATENT OFFICE.

ALBERT V. LINDQUIST, OF ALEXANDRIA, MINNESOTA.

FILM-DEVELOPING MACHINE.

No. 815,300.     Specification of Letters Patent.     Patented March 13, 1906.

Application filed April 27, 1904. Renewed November 28, 1905. Serial No. 289,526.

*To all whom it may concern:*

Be it known that I, ALBERT V. LINDQUIST, a citizen of the United States, residing at Alexandria, in the county of Douglas and State of Minnesota, have invented certain new and useful Improvements in Film-Developing Machines; and I do hereby declare the following to be a full, clear, and exact description of the invention, such as will enable others skilled in the art to which it appertains to make and use the same.

My invention relates to means for developing sensitized films employed in photography; and it consists of certain novel features of combination and construction of parts, the preferred form whereof will be hereinafter clearly set forth, and pointed out in the claims.

The prime object of my invention, among others, is to provide means for taking the film from the kodak or other photographic apparatus and unwind the same from the film-carrier and wind it upon another suitable roller in such a manner that the developing solution can readily reach all parts of the sensitized surface thereof without subjecting the film to exposure to light.

Other objects and advantages will be hereinafter made clearly apparent, reference being had to the accompanying drawings, which are considered a part of this application, and in which—

Figure 4:
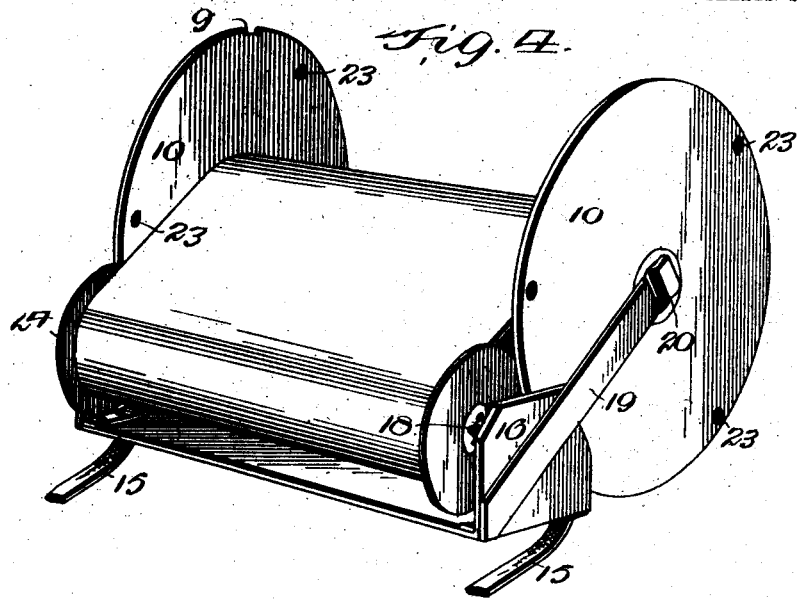
Figure 5:
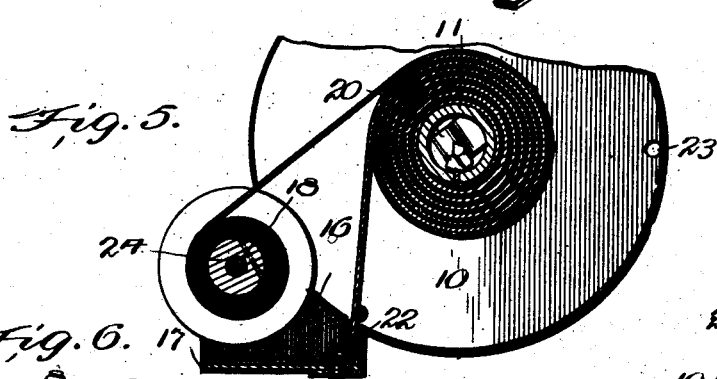
Figures 6, 7:
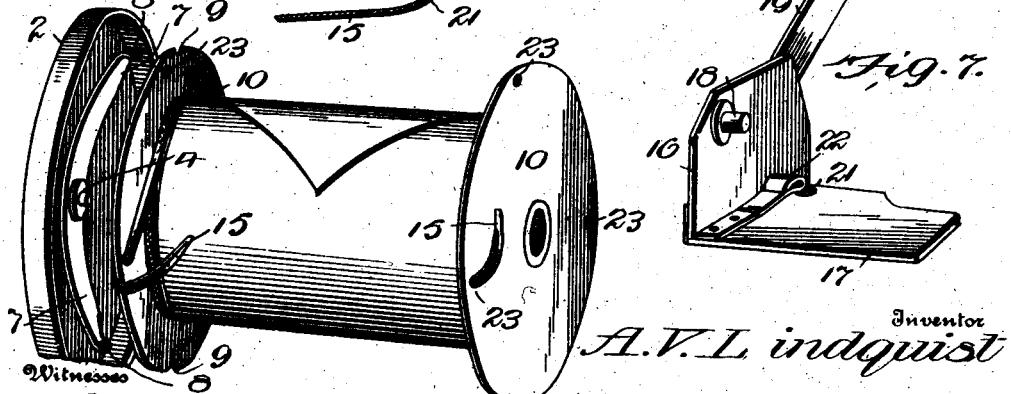

Figure 1 shows a perspective view of my apparatus complete. Fig. 2 is a central sectional view of Fig. 1. Fig. 3 is a perspective detail view of the winding-spool upon which the film is wound from the film-carrying spool of the photographic apparatus. Fig. 4 is a perspective detail view showing the film-roll as taken from the photographic apparatus, indicating how it is paid off from said roller upon my special form of spool adapted to introduce the developing solution to the sensitized surface of the film. Fig. 5 is a transverse section of my special form of spool and the film-carrying spool of the photographic apparatus, indicating how the two spools are temporarily connected together in order that the film may be delivered from one to the other. Fig. 6 is a perspective view of my special form of spool and the closure of the receptacle designed to receive the same. Fig. 7 is a perspective detail view of a part of the device employed for temporarily connecting my special form of spool to the film-roller whereby the film may be wound upon the special roller.

For convenience of reference to the various details of my invention and coöperating accessories numerals will be employed, the same numeral applying to a similar part throughout the several views.

It may be stated in this connection that I employ a special form of spool, preferably of aluminium, and a suitable casing therefor, also preferably of the same material, and upon said special spool the film is disposed from off the film-roll as it comes from the photographic apparatus, my special form of spool being so constructed, as will be hereinafter specifically set forth, and the sensitized film wound thereon so separated whereby the sensitized surface thereof will not contact with anything whatever, but will be held properly separated, whereby the developing solution will reach every part of the surface thereof, as is essential for its proper development.

Referring to the numerals on the drawings, 1 indicates the body portion or casing, which, as before stated, is preferably formed of aluminium, whereby it will more properly resist the corroding effects of the developing solution, a suitable closure or lid section 2 being provided, said lid-section having a central bearing-seat, as indicated by the disk-like members 3 and 4, said seat being designed to receive the inwardly-directed crank-like terminal 5 of the handle member 6, said disk being tightly secured to the terminal 5, whereby it will be held in proper position, though left free to rotate.

To the extreme inner end of the crank-like terminal 5 I rigidly secure the spring-arms 7, each provided with a hook-terminal 8, designed to engage the recesses 9 in the end of the spool 10, the body portion of the spool being designated by the numeral 11. The body portion 11 is tubular, as will be observed by reference to Fig. 2, and is provided throughout its surface with a plurality of openings 12, any preferred number of said openings being formed, their office being to facilitate the introduction of the developing-fluid, as will be hereinafter more particularly pointed out. I also provide a slot 13 in the body of the spool, said slot being designed to receive the end of the black strip of paper commonly wound upon the film-spool for the purpose of excluding the light therefrom. Near the ends of the body portion 11 I also provide the slots 14, intended for the purpose of receiving the knotted ends of the braid members 15, which will insure that the braid will be wound upon the spool-body simultaneous with the winding thereon of the sensitized film and blank strip of paper accompanying the same, the office subserved by the braid being to separate the successive windings of the blank strip of paper and film, whereby the sensitized surface of the latter will be held from contact with the previous winding and at the same time provide a continuous annular space through which the developing solution may freely pass incident to the developing process proper, which will be hereinafter particularly described.

It becomes necessary to provide a suitable connecting device for my special form of spool and the film cartridge or spool as it leaves the photographic apparatus, whereby the film may be wound upon my special form of spool, and with this object in view I provide a carriage for the cartridge comprising the end sections 16, connected with each other by the plate 17, said end sections being provided with inwardly-directed trunnions 18, designed to take into the bore of the film-spool and permit the free rotation thereof incident to unwinding the film. The end sections are also provided with the spring-arms 19, which also have inwardly-directed extensions 20 of proper size to be received by the tubular bore of the body-section 11, though of such form as to freely admit the passage of the developing solution into said bore and thence outward through the plurality of apertures 12 and into the annular space between each successive layer of film and between the two braids disposed along the edges of the film after the latter has been wound upon the special form of spool, as before explained.

It will be observed that the end sections or disks 10 of my special form of spool are of comparatively large diameter, which will insure that the edges of the film wound upon the spool-body will be fully protected and the light excluded while the transferring process from different solutions is being carried out, the two black braids 15 also serving the double purpose of excluding the light and separating the film from contact with any other object.

During the winding of the film and the black strip of paper accompanying the same upon my special form of spool the end of the black braid 15 is passed through an aperture 21 in the plate 17, a spring-finger 22 being provided to insure that the braid will be wound upon the special form of spool without twisting, the said finger also having the requisite degree of tension to keep the braid taut while being wound, whereby it will not be paid off faster than is required, and thus become twisted or tangled.

As will be observed by reference to Fig. 2, the spring-arms 7 when placed in engagement with the end of the spool through the mediation of the notches or recesses 9 will insure that the entire spool will be removed from the receptacle 1 when the closure or lid member 2 is withdrawn, thereby affording a convenient and cleanly means of removing the spool from the solution within the receptacle 1. After the film and the strip of black paper accompanying the same have been wound upon my special form of spool the ends of the braid may be passed through one of a plurality of apertures 23, and thus secured against casual unwinding, which will also insure that the paper and the film will be held tightly in place ready to be introduced into the developing solution. After the film and its accompanying strip of paper have been unwound from the cartridge or the spool 24 upon which it came from the kodak or photographic apparatus and the ends of the braid 15 properly secured, as by passing the same through the aperture 24, the entire spool 11 and its accompanying load are introduced into the receptacle 1, which latter is provided with a proper quantity of the developing solution, and it is obvious that by turning the handle 6 the solution will find its way throughout the entire surface of the film and act thereon as desired. After a proper contact has been made between the developing solution and the film the closure or lid 2 may be removed, taking with it my special form of spool and the treated film thereof ready for any successive treatment by means of other forms of solution, as required.

It is obvious that since the body 11 of my spool is tubular and provided with a plurality of openings the solution will readily find its way through said openings and thence between the braids 15 and throughout the annular space left between the successive windings of the film.

It will thus be seen that I have provided a reliably-efficient appliance for totally excluding the light from a sensitized film as it comes from the film-cartridge of the kodak or other appliance, it being understood that the transferring process from one spool to the other can be readily accomplished by holding the apparatus within a rubber bag without the necessity of going into a dark room for this purpose.

The various parts of my invention may be made any desired size and of any suitable material deemed necessary in carrying out the ideas set forth, and while I have described the preferred combination and construction of parts I desire to comprehend in this application all substantial equivalents and substitutes which may be regarded as falling fairly within the scope and purview of my invention.

Believing that the construction, advantages, and manner of using my invention have thus been made clearly apparent, further description of the details is dispensed with.

What I claim as new, and desire to secure by Letters Patent, is—

1. A spool of suitable material to withstand the action of chemicals employed in developing photographic films, said spool having a hollow perforated body portion, said body portion being provided with a longitudinal slot or other means carried by said body portion to engage the end of the strip of paper accompanying the film; a pair of braids connected to said spool and adapted to be wound thereon simultaneously with the winding of the paper and film whereby the braids will be disposed at the edges of the film to hold the latter isolated from other parts, the said spool having extended flanges for the exclusion of light; a carriage coöperating with the ends of the spool and adapted to carry the film-cartridge that a film may be unwound therefrom upon said spool, in combination with a suitable receptacle adapted to receive the said spool and the film carried thereon and suitable means to connect it with the lid of said receptacle that the spool may be rotated within the solution contained in said receptacle, all combined substantially as specified and for the purpose set forth.

2. The herein-described film-developing machine, comprising a suitable receptacle having a removable closure at one end, a spool having a hollow body portion and end sections 10, adapted to enter said receptacle, means carried by said closure adapted to engage said spool whereby the same may be rotated, braid members secured to said body portion at each end thereof adjacent to the inner face of said end sections, adapted to be wound upon the spool-body simultaneously with the winding thereon of the sensitized film whereby a channel will be formed between each successive winding of the film through which the developing fluid may flow and come in contact with the film, all substantially as set forth.

3. In a film-developing machine, the combination with a film-receiving spool having a hollow body portion and a longitudinal slot in said body portion adapted to engage the end of the film and cause it to wind thereon, of a carriage comprising the end sections 16 and plates 17, inwardly-directed trunnions 18 carried by said end sections and adapted to receive a film-carrying cartridge, and spring-arms extending from said end sections having inwardly-directed extensions adapted to enter the bore of said body portion and dispose the cartridge in proper juxtaposition to deliver said film to said spool, substantially as set forth.

4. In a film-developing machine, the combination with a film-carrying spool having a hollow body portion and braids secured thereto, of a frame adapted to carry a film-cartridge and dispose the film in position to be wound upon said spool, arms adapted to removably secure said frame to said braids and dispose the same at a proper tension between each successive winding of the film upon the body portion of said spool, substantially as set forth.

5. The herein-described film-developing machine, comprising a suitable receptacle having a removable closure, a spool having a hollow body portion and end sections, adapted to be received by said receptacle, said body portion having a longitudinal slot to receive the free end of the film and also having openings for the passage of the developing solution, means to engage and rotate said spool, braid members secured to said body portions adjacent to the end sections of said spool, and means to dispose said braid members at a proper tension between each successive winding of the film upon said body portion whereby a space will be left between each successive winding of the film through which the developing fluid may flow and come in contact with the sensitized surface of the film, all substantially as set forth.

In testimony whereof I have signed my name to this specification in the presence of two subscribing witnesses.

ALBERT V. LINDQUIST.

Witnesses:
    GEO. L. TREAT,
    J. S. COWEN.